No. 668,838. Patented Feb. 26, 1901.
HENRI DE RUFZ DE LAVISON.
VOLTAIC BATTERY.
(Application filed July 19, 1899.)

(No Model.) 2 Sheets—Sheet 1.

WITNESSES:
René Bruine
Thomas F. Wallace

INVENTOR:
Henri de Rufz de Lavison
By his Attorneys,
Arthur G. Fraser

No. 668,838. Patented Feb. 26, 1901.
HENRI DE RUFZ DE LAVISON.
VOLTAIC BATTERY.
(Application filed July 19, 1899.)
(No Model.) 2 Sheets—Sheet 2.

WITNESSES:
Fred White
Domingo A. Usina

INVENTOR:
Henri de Rufz de Lavison,
By his Attorneys:
Arthur C. Fraser & Co.

UNITED STATES PATENT OFFICE.

HENRI DE RUFZ DE LAVISON, OF PARIS, FRANCE, ASSIGNOR TO STE. D'ETUDE DES PILES ELECTRIQUES, OF SAME PLACE.

VOLTAIC BATTERY.

SPECIFICATION forming part of Letters Patent No. 668,838, dated February 26, 1901.

Application filed July 19, 1899. Serial No. 724,335. (No model.)

*To all whom it may concern:*

Be it known that I, HENRI DE RUFZ DE LAVISON, a citizen of the Republic of France, residing in Paris, France, have invented certain new and useful Improvements in Voltaic Batteries, of which the following is a specification.

Figure 1:
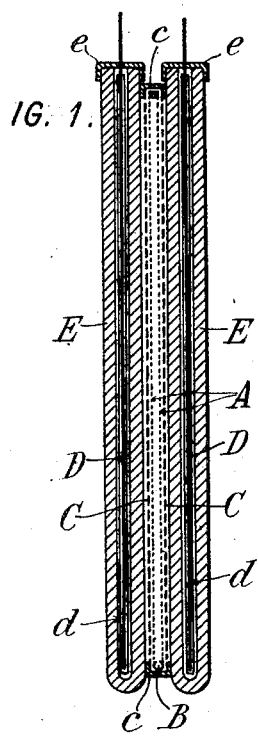
Figure 2:
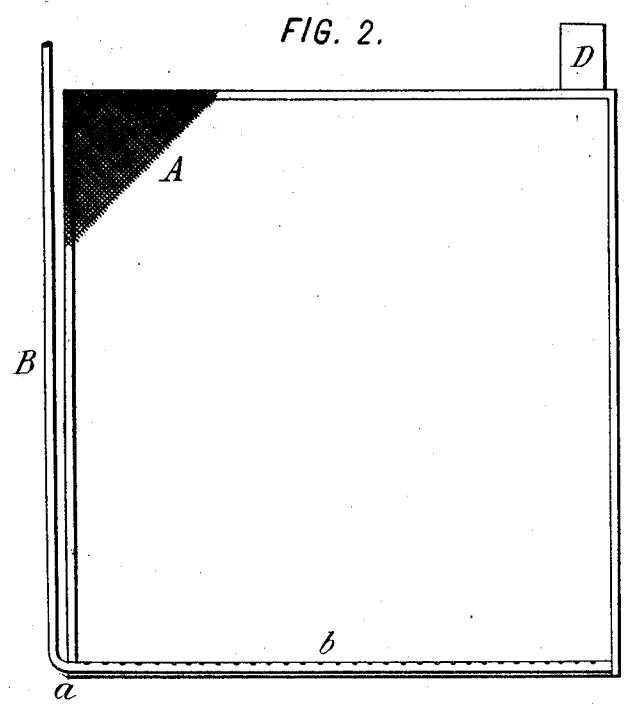
Figure 3:
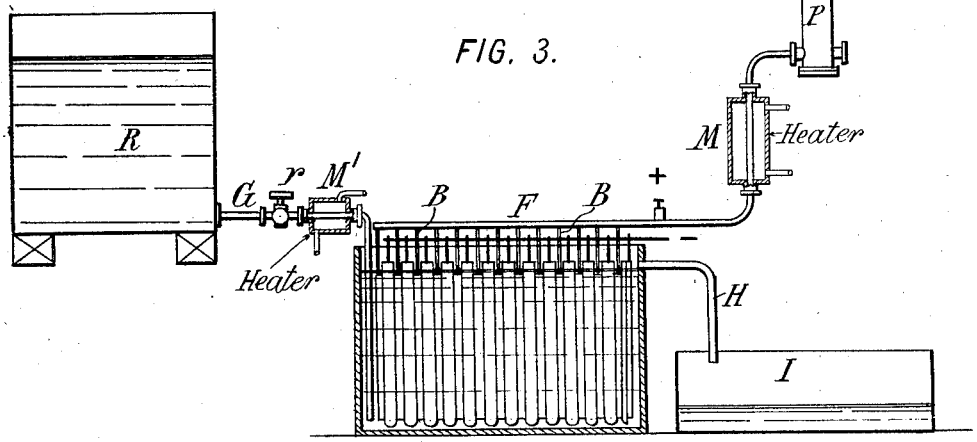
Figure 4:
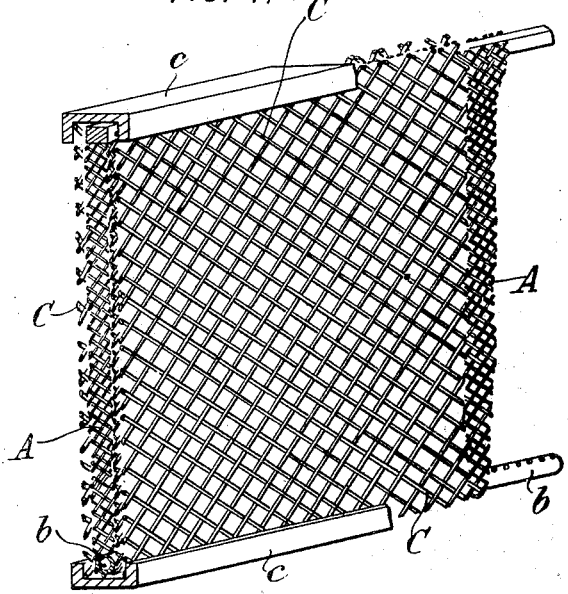
Figure 5:
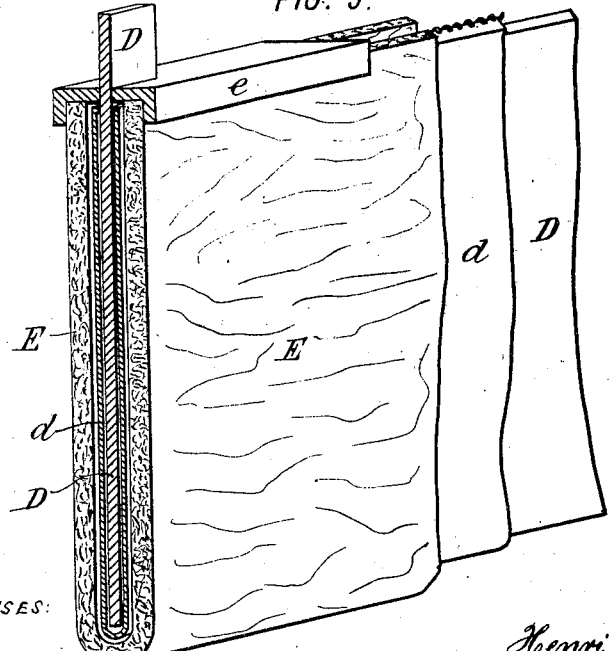

My invention relates to improvements in voltaic batteries of the kind in which the current is produced solely by the attacking of the metal of one of the electrodes by the electrolyte, and in which heated air acts as a depolarizer; but instead of the air acting outside the battery or escaping through the electrolyte, as in former batteries of this type, it is, according to my present invention, led into the copper electrodes, where there is thus provided a kind of internal atmosphere of hot air in intimate contact with the electrolyte and capable of absorbing on the electrode itself the hydrogen which is disengaged, causing polarization. For this purpose the battery is constructed as follows:

Figure 1 is a transverse section of a cell of battery. Fig. 2 is a vertical section, the gauze being broken away except at one corner. Fig. 3 is, on a smaller scale, a general view of the battery with the reservoir of electrolyte. Fig. 4 is a sectional perspective, on a large scale, of one of the negative electrodes. Fig. 5 is a similar view of one of the positive electrodes.

My battery has a number of elements, each of which has a negative electrode constructed as follows: Two sheets of copper gauze A or of finely-perforated copper are set a little apart and soldered together at the edges, so as to form a thin case, into the lower part of which leads a small air-pipe B, which is secured at $a$, or it may be extended along the base at $b$ with perforations for distributing the air uniformly within the case. On the outside of this case, on each side, is fixed a protecting-sheet C of large-meshed copper gauze, which forms part of the electrode. This sheet C is secured on the edges by a U-frame of copper $c$.

Each positive electrode consists of two zinc plates D, one on each side of the negative electrode, each of these plates being covered with parchment-paper $d$, and a thick sheet of asbestos E, bent around the plates in U form and having their top edges secured together by a U-clamp of celluloid $e$.

The air-tubes B, which supply the cases, (see Fig. 3,) are vertical branches from a pipe F, that extends along the battery above it from an air-pump F, which is worked from time to time to force heated air into the copper cases. This issuing through the meshes of the gauze clears away the hydrogen.

The electrolyte liquid is fed from a cistern R at one end of the battery by a pipe G with a cock $r$, which pipe descends to the bottom of the battery and overflows at the other end into a tank I by pipe H, whence it may be transferred back to the supply-reservoir.

The strokes of the air-pump cause, as it were, throbbing movements of the walls of the positive electrodes, which greatly promote the depolarizing action. Where the pile in use is subjected to external heat, as is frequently the case, it is evident that the electrolyte will communicate a portion of its heat directly to the depolarizing air and obviate the necessity of additional heating means, or the electrolyte may be heated by passing it through a heater M' of any convenient type with the same effect.

I claim—

A battery composed of positive electrodes formed of zinc plates covered with parchment-paper and inclosed in cases of non-conducting material, negative electrodes of copper which are hollow and have foraminous walls adapted to contain an internal atmosphere of hot air in intimate contact with the electrolyte and capable of absorbing the hydrogen which is disengaged and tends to cause polarization, and means for connecting the battery to a source of hot air.

In witness whereof I have hereunto signed my name, this 3d day of July, 1899, in the presence of two subscribing witnesses.

HENRI DE RUFZ DE LAVISON.

Witnesses:
 EDWARD P. MACLEAN,
 ALEXANDRE MATHIEU.